(12) United States Patent
Dory et al.

(10) Patent No.: US 11,184,700 B2
(45) Date of Patent: Nov. 23, 2021

(54) CONDENSATION CONTROL HEADSETS

(71) Applicant: Hewlett-Packard Development Company, L.P., Spring, TX (US)

(72) Inventors: Jon R. Dory, Spring, TX (US); David H. Hanes, Fort Collins, CO (US); Matthew Flach, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/049,039

(22) PCT Filed: Aug. 30, 2018

(86) PCT No.: PCT/US2018/048773
§ 371 (c)(1),
(2) Date: Oct. 20, 2020

(87) PCT Pub. No.: WO2020/046322
PCT Pub. Date: Mar. 5, 2020

(65) Prior Publication Data
US 2021/0243515 A1      Aug. 5, 2021

(51) Int. Cl.
| | |
|---|---|
| *H04R 1/10* | (2006.01) |
| *G06F 1/20* | (2006.01) |
| *G01D 21/00* | (2006.01) |
| *H04R 29/00* | (2006.01) |
| *G01P 15/08* | (2006.01) |

(52) U.S. Cl.
CPC .......... *H04R 1/1041* (2013.01); *G01D 21/00* (2013.01); *G01P 15/08* (2013.01); *G06F 1/206* (2013.01); *H04R 1/1008* (2013.01); *H04R 1/1083* (2013.01); *H04R 1/1091* (2013.01); *H04R 29/001* (2013.01)

(58) Field of Classification Search
CPC .... H04R 1/1041; H04R 1/1008; G01D 21/00; G01P 15/08; G06F 1/206
See application file for complete search history.

(56) References Cited

U.S. PATENT DOCUMENTS

| | | | |
|---|---|---|---|
| 9,488,565 B2 | 11/2016 | Zielinski et al. | |
| 9,942,647 B2 | 4/2018 | Di Censo et al. | |
| 10,261,555 B1* | 4/2019 | Cooper | H05K 7/20972 |
| 2009/0274317 A1 | 11/2009 | Kahn et al. | |
| 2010/0217099 A1* | 8/2010 | LeBoeuf | A61B 5/4812 |
| | | | 600/301 |
| 2011/0013780 A1 | 1/2011 | Yamkovoy | |

(Continued)

FOREIGN PATENT DOCUMENTS

| | | |
|---|---|---|
| CN | 101287300 A | 10/2008 |
| CN | 104244129 A | 12/2014 |

(Continued)

*Primary Examiner* — Simon King
(74) *Attorney, Agent, or Firm* — HP Inc. Patent Department

(57) ABSTRACT

In an example implementation according to aspects of the present disclosure, a method may include receiving a first data value from a sensor coupled to a headset. The first data value indicates a condition indicative of condensation local to the sensor. A first delta based on the first data value and a predetermined condensation data value is determined. Based on the first delta surpassing a first threshold, a cooling device coupled to the headset is deactivated.

15 Claims, 4 Drawing Sheets

(56) References Cited

U.S. PATENT DOCUMENTS

| | | | |
|---|---|---|---|
| 2011/0268290 A1 | 11/2011 | Lee | |
| 2017/0099539 A1* | 4/2017 | Di Censo | H04R 1/1008 |
| 2018/0220219 A1* | 8/2018 | Karacal | H04R 1/1066 |
| 2021/0204051 A1* | 7/2021 | Hanes | H04R 1/1091 |

FOREIGN PATENT DOCUMENTS

| | | |
|---|---|---|
| CN | 205408108 U | 7/2016 |
| KR | 20160055640 A | 5/2016 |
| TW | 201540080 A | 10/2015 |
| WO | WO-2010009636 A1 | 1/2010 |
| WO | WO-2012058886 A1 | 5/2012 |
| WO | WO-2012162140 A3 | 8/2013 |

* cited by examiner

CONDENSATION CONTROL HEADSETS

BACKGROUND

Headsets mount on a user's head where the head supports the weight of the headset and contacts the skin and hair of the user. Headsets may be utilized to provide sensory information to a user including visual images and sounds. Additionally, headsets may be utilized for occupational assistance applications.

DETAILED DESCRIPTION

Headsets often include a padded sealed enclosure coupled to the head mounted unit, wherein the sealed enclosure directs a sensory input to a wearer and restricts ambient interference for comfort as well as to suppress ambient noise from reaching the user's ears. The padded sealed enclosure often act as insulators, capturing body heat released from the user's ears and head. The captured heat may become uncomfortable during prolonged usage. A cooling device may be included in the headset design to remove the heat from the sealed enclosure. As body heat may often include moisture, in addition to humidity in the ambient air, condensation on the cooling device may form. Described herein are condensation control headsets.

Figure 1:
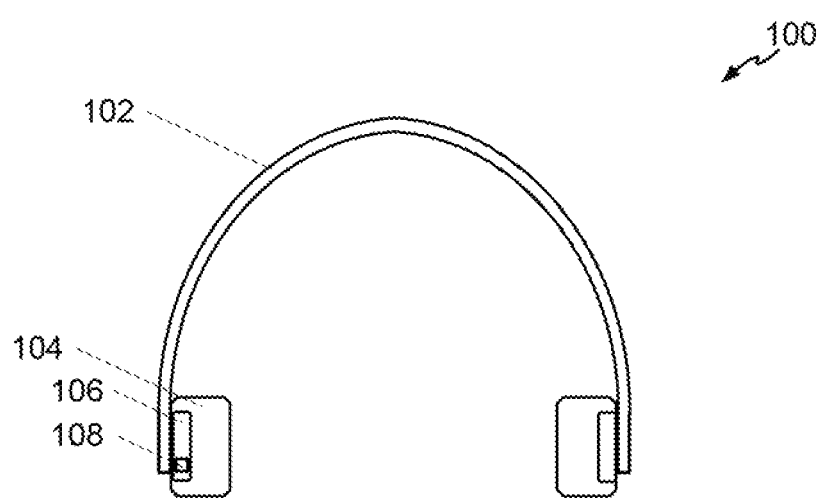
FIG. 1 is an illustration of a condensation controlling headset according to an example.

FIG. 1 is an illustration 100 of a condensation controlling headset according to an example. A condensation control headset may include headset 102, one or more sealed enclosures 104, one or more cooling devices 106, and a computing device 108 to control condensation. In one implementation, the sealed enclosures 104 may not itself be sealed, however the "sealing" may take place when at the point of contact between the enclosures and a user.

The headset 102 may provide support for the one or more sealed enclosures 104. The headset 102 may be configured to utilize tension to apply pressure from the one or more sealed enclosures 104 against the head of a user. The headset 102 may be oriented to traverse the top of the head similar to audio headset implementations. Alternatively, the headset 102 may be oriented to traverse the back of the head similar to virtual reality headset implementations.

One or more sealed enclosures 104 may be coupled or attached to the headset 102. The one or more sealed enclosures 104 may be integrated into the structure of the headset 102 where no discrete demarcation exists. The one or more sealed enclosures 104 may include an output device. The output device may correspond to the implementation of the headset as a whole. In one example, the headset 102 may be an audio headset, where the output device may include a speaker. In another example, the headset 102 may be a virtual reality (VR), augmented reality (AR), or mixed reality (MR) headset, where the output device may include a display screen. In the latter implementation, an audio component may additionally be integrated. The output device may be communicatively coupled to a content system. The content system may be configured to send a signal to the output device. The signal may be utilized by the output device to provide output corresponding to the human sense target. For example, the signal for an audio headset may be an audio signal. Alternatively, for a VR, AR, or MR headset, the signal may be a video signal, or a video signal and audio signal. The one or more sealed enclosures 104 may include a padding for user comfort.

A cooling device 106 may be coupled a sealed enclosure 104. Sealed enclosures 104 may include padding that may act as heat insulators. A cooling device 106 may be added to the sealed enclosure 104 to remove excess heat that may become trapped within the sealed enclosure 104. A cooling device 106 may include but is not limited to thermo-electric cooling devices, heat pipe devices, and fans.

A computing device 108 for condensation control may be communicatively coupled to the cooling device 106. The computing device 108 may include a processor or controller coupled to a memory device hosting instructions to control condensation.

Figure 2:
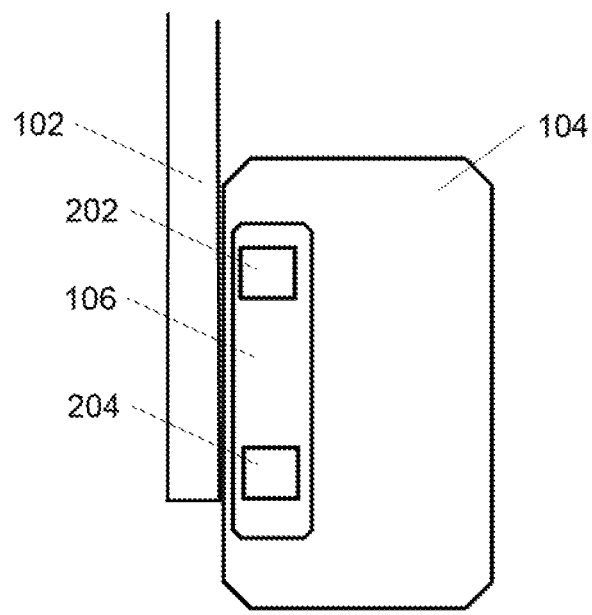
FIG. 2 illustrates a sealed enclosure of a headset configured to control condensation according to an example.

FIG. 2 illustrates a sealed enclosure of a headset configured to control condensation according to an example. A sensor 202 may be coupled to the cooling device 106. The sensor 202 may be utilized to collect data relating to the humidity or condensation collecting on or around the cooling device 106. Where the sensor 202 detects moisture, the sensor may include a hygrometer and the data collected corresponds to detected moisture deposit on the sensor 202. The hygrometer may be capacitive, resistive or thermal. Alternatively, the sensor 202 may be utilized to collect data relating to usage. Alternatively, the sensor 202 may be a water detector to directly detect condensation accumulation on the cooling device. In an effort to proactively deactivate the cooling device 106 when the headset is not in use, the sensor may include an inertial measurement sensor and the data collected may correspond to a headset movement history. Additionally, the predetermined condensation data value corresponds to an amount of time indicative of lack of use of the headset. A delta determined by comparing the data to the predetermined condensation data value may be a time difference of inactivity to the predetermined condensation data value. In another implementation, the sensor 202 may be a software sensor and the data collected may correspond to a transmission of a signal to the headset.

A controller 204 may be communicatively coupled to the cooling device 106 and the sensor 202. The controller 204 may be integrated with the whole of the headset assembly. Alternatively, the controller 204 may be remote to the headset assembly. The controller 204 may be in communication, either wired or wirelessly, with the cooling device 108 and the sensor 202. The controller 204 may be configured to receive data from the sensor 202 corresponding to states of the cooling device 106 or the headset 102. The controller 204 may also be configured to actuate the cooling device 106. In one embodiment, the controller 204 may be configured to toggle power to the cooling device 106. In another embodiment, the controller 204 may be configured to incrementally change the cooling potential of the cooling device 106 through adjustments in power provided to the cooling device.

Figure 3:
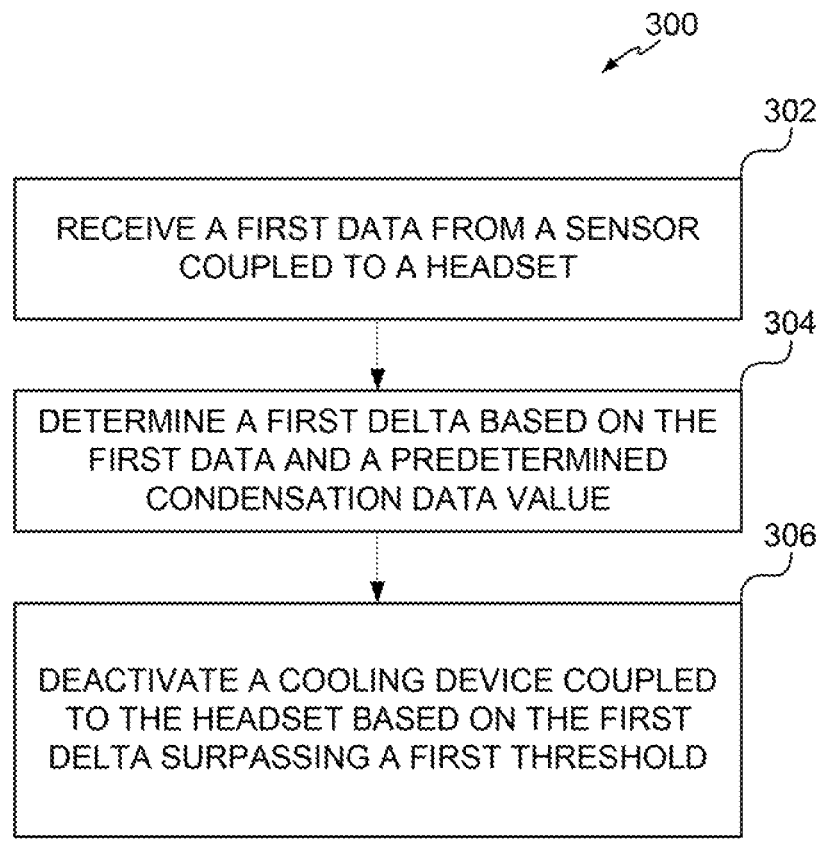
FIG. 3 is a flow diagram illustrating a method to control condensation in headsets, in accordance with an example of the present disclosure.

FIG. 3 is a flow diagram illustrating a method 300 to control condensation in headsets, in accordance with an example of the present disclosure. In discussing FIG. 3, reference may be made to the example illustrated in FIG. 2. At step 302, the controller 204 receives a first data value from a sensor coupled to a headset. The first data value may correspond to a conditional state where the cooling device may be exposed to excessive condensation. In one implementation, the first data value may correspond to the detection of high humidity or condensation on or near the cooling device by an associated hygrometer. In another implementation, the first data value may correspond to an absence of movement of the headset based on a history of movement as detected by an associated inertial measurement sensor (e.g. accelerometer). The history of movement may correspond to the movement of a user's head in reaction to sensory input. The absence of movement may correspond to the removal of the headset from the user's head, indicating that the headset may no longer be in use. In another implementation, the first data value may correspond to an absence of input signal to the controller of the headset as detected by a software sensor. The absence of input signal may correspond to a period of non-use of the headset by the user. The first data value may correspond to a reading from the appropriate sensor implementation at an interval during the usage of the headset.

At step 304, the controller 204 determines a first delta based on the first data value and a predetermined condensation data value. The controller may retrieve a predetermined condensation data value corresponding to the sensing method described above. In one implementation, the predetermined condensation value may correspond to a relative humidity level or an absolute humidity level based on the implementation of hygrometer (capacitive versus thermal) as the sensor. The predetermined condensation value may correspond to a normal operating humidity value for the cooling device. In another implementation, the predetermined condensation value may correspond to a movement absence period based on the implementation of an inertial measurement sensor as the sensor. In another implementation, the predetermined condensation value may correspond to a signal absence period based on the implementation of a software sensor as the sensor. The controller may compare the predetermined condensation data value against the first data value. A difference between the first data value and the predetermined condensation data value may be determined and stored as a first delta value.

At step 306, the controller 204 deactivates the cooling device coupled to the headset based on the first delta surpassing a first threshold. The controller 204 compares the delta value against a first threshold. The first threshold may correspond to a threshold delta value determinative of a point at which the cooling device may be exposed to unacceptable condensation or humidity levels. Alternatively, the threshold may correspond to a point at which the cooling device may be approaching unacceptable condensation or humidity levels and may be throttled to avoid surpassing the unacceptable condensation or humidity levels. In another implementation, the controller 204 activates the cooling device coupled to the headset based on the first delta falling short of a first threshold. The controller 204 may activate the cooling device when the condensation has not passed a critical point. The activation may allow the cooling device to run longer, allowing better cooling to the sealed enclosure.

Alternatively, the controller may receive a second data value, from the software sensor. The second data value may indicate a transmission of a signal to the headset. The signal may be an audio signal or video signal or a combination of both audio and video signals. The second data value may also indicate an attenuation of the transmission. The attenuation may occur due to the cessation of usage of the headset by the user. The attenuation may be utilized in combination with an inertial measurement sensor-based first data value, where the headset has not moved. The lack of movement and the attenuation of transmission signal may be indicative of the cessation of usage. The attenuation may also be utilized in combination with other sensor implementation-based reading, where the combination of condensation presence and attenuation of signal indicate a condition where the headset is no longer in use and condensation may be mitigated. For example, the first data value may be indicative of some condensation. The predetermined condensation data value may correspond with a lower level of condensation. The lower level and accompanying first threshold may be enough to trigger a determination of whether the attenuation of the signal may be evaluated. In the instance where the both the first threshold and second threshold are surpassed, the cooling device may be deactivated.

Additionally, the controller may determine that the cessation of the attenuation based no longer meets the corresponding threshold value, indicating that usage has resumed, and the cooling device may be activated.

The controller may determine a second delta based on the second data value and a predetermined attenuation data value. As described above, the predetermined attenuation data value corresponds to a period of time where the signal is attenuated enough to indicate a cessation of usage by the user. A second delta is determined by comparing the second data value and the predetermined attenuation data value.

The controller may deactivate the cooling device based on the second delta surpassing a second threshold. The second threshold may correspond to a second threshold delta value determinative of a point at which the headset may no longer be in use. Alternatively, the threshold may correspond to a point at which the headset may be approaching a period of inactivity indicative that the headset may no longer be in use.

Figure 4:
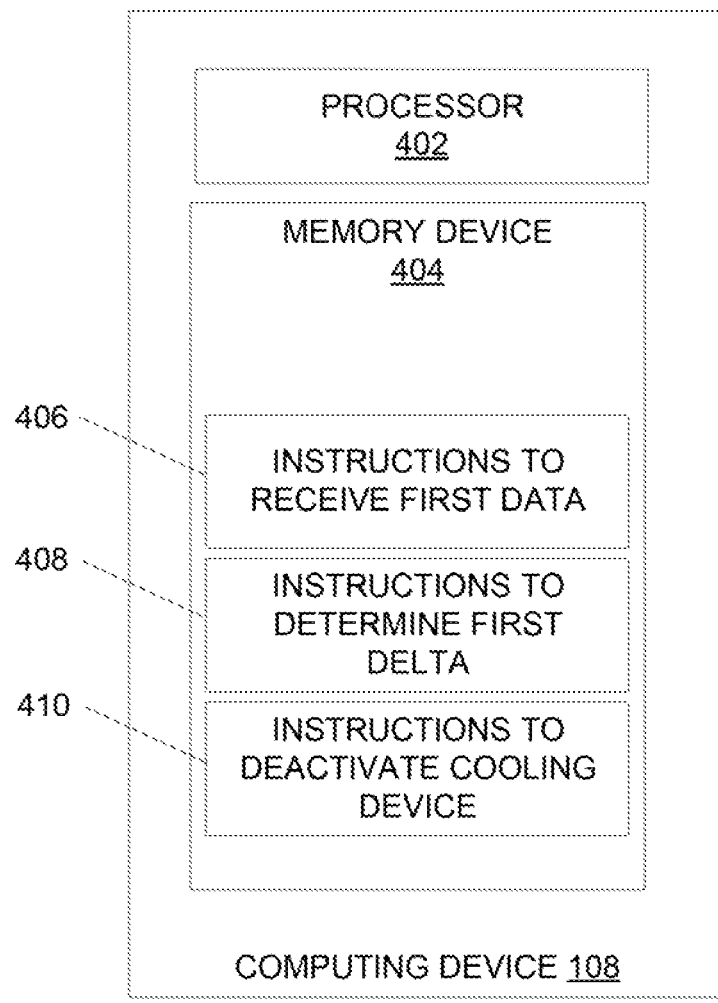
FIG. 4 is a flow diagram illustrating a method at a computing device to control condensation in headsets, according to an example.

FIG. 4 is a flow diagram illustrating a method at a computing device to control condensation in headsets, according to an example. The computing device 400 depicts a processor 402 and a memory device 404 and, as an example of the computing device 400 performing its operations, the memory device 404 may include instructions 406-410 that are executable by the processor 402. Thus, memory device 404 can be said to store program instructions that, when executed by processor 402, implement the components of the computing device 400. The executable program instructions stored in the memory device 404 include, as an example, instructions to receive first data value 406, instructions to determine a first delta 408, and instructions to deactivate a cooling device 410. Instructions 406-410 may be computer readable instructions implementing the method described as steps 302-306 above in the description of FIG. 3. The instructions 406-410 may be natively compiled for the processor 402 or alternatively may be compiled to platform independent intermediary code (e.g. JAVA bytecode) for interpretation by the processor 402.

Memory device 404 represents generally any number of memory components capable of storing instructions that can be executed by processor 402. Memory device 404 is non-transitory in the sense that it does not encompass a transitory signal but instead is made up of at least one memory component configured to store the relevant instructions. As a result, the memory device 404 may be a non-transitory computer-readable storage medium. Memory device 404 may be implemented in a single device or distributed across devices. Likewise, processor 402 represents any number of processors capable of executing instructions stored by memory device 404. Processor 402 may be integrated in a single device or distributed across devices.

Further, memory device 404 may be fully or partially integrated in the same device as processor 402, or it may be separate but accessible to that device and processor 402.

In one example, the program instructions 406-410 can be part of an installation package that when installed can be executed by processor 402 to implement the components of the computing device 400. In this case, memory device 404 may be a portable medium such as a CD, DVD, or flash drive or a memory maintained by a server from which the installation package can be downloaded and installed. In another example, the program instructions may be part of an application or applications already installed. Here, memory device 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A device comprising:
    a headset;
    a sealed enclosure coupled to the headset, wherein the sealed enclosure directs a sensory input to a wearer and restricts ambient interference;
    a cooling device coupled to the sealed enclosure;
    a sensor communicatively coupled to the cooling device;
    a controller, communicatively coupled to the cooling device and the sensor, configured to:
        receive a first data value from the sensor, wherein the first data value indicates a condition indicative of condensation local to the sensor,
        determine a first delta based on the first data value and a predetermined condensation data value; and
        deactivate the cooling device based on the first delta surpassing a first threshold.

2. The device of claim 1, wherein the sensor comprises an inertial measurement sensor, the first data value corresponds to a headset movement history and the predetermined condensation data value corresponds to an amount of time indicative of lack of use of the headset.

3. The device of claim 1, wherein the sensor comprises a hygrometer, and the first data value corresponds to a detected moisture deposit on the hygrometer.

4. The device of claim 1, the cooling device comprises a thermo-electric cooling device.

5. The device of claim 1, further comprising the controller to:
    receive a second data value, from the sensor, wherein the second data value indicates a transmission of a signal to the headset and an attenuation of the transmission;
    determine a second delta based on the second data value and a predetermined attenuation data value; and
    deactivate the cooling device based on the second delta surpassing a second threshold.

6. A computing device comprising:
    a processor;
    a memory device, communicatively coupled to the processor, having instructions stored thereon that when executed cause the processor to:
        receive a first data value from a sensor coupled to a headset, wherein the first data value indicates a condition indicative of condensation local to the sensor,
        determine a first delta based on the first data value and a predetermined condensation data value; and
        activate a cooling device coupled to the headset based on the first delta falling short of a first threshold.

7. The computing device of claim 6, the sensor comprises an inertial measurement sensor, the first data value corresponds to a headset movement history and the predetermined condensation data value corresponds to an amount of time indicative of lack of use of the headset.

8. The computing device of claim 6, wherein the sensor comprises a hygrometer, and the first data value corresponds to a detected moisture deposit on the hygrometer.

9. The computing device of claim 6, the cooling device comprises a thermo-electric cooling device.

10. The computing device of claim 6, further comprising the instructions to:
    receive a second data value, from the sensor, wherein the second data value indicates a transmission of a signal to the headset and an attenuation of the transmission;
    determine a second delta based on the second data value and a predetermined attenuation data value; and
    deactivate the cooling device based on the second delta surpassing a second threshold.

11. A method comprising:
    receiving a first data value from a sensor coupled to a headset, wherein the first data value indicates a condition indicative of condensation local to the sensor,
    determining a first delta based on the first data value and a predetermined condensation data value;
    receiving a second data value, from a second sensor, wherein the second data value indicates a transmission of a signal to the headset and an attenuation of the transmission;
    determining a second delta based on the second data value and a predetermined attenuation data value; and
    deactivating the cooling device based on the first delta surpassing a first threshold and the second delta surpassing a second threshold.

12. The method of claim 11, wherein the sensor comprises an inertial measurement sensor, the first data value corresponds to a headset movement history and the predetermined condensation data value corresponds to an amount of time indicative of lack of use of the headset.

13. The method of claim 11, wherein the sensor comprises a hygrometer, and the first data value corresponds to a detected moisture deposit on the hygrometer.

14. The method of claim 11, wherein the first threshold comprises a predetermined user selected value.

15. The method of claim 11, the cooling device comprises a thermo-electric cooling device.

* * * * *